United States Patent
Higashitani et al.

(10) Patent No.: US 10,737,692 B2
(45) Date of Patent: Aug. 11, 2020

(54) PARKING ASSISTANCE CONTROL APPARATUS

(71) Applicant: DENSO CORPORATION, Kariya, Aichi-pref. (JP)

(72) Inventors: Mitsuharu Higashitani, Kariya (JP); Noriaki Ikemoto, Kariya (JP)

(73) Assignee: DENSO CORPORATION, Kariya (JP)

(*) Notice: Subject to any disclaimer, the term of this patent is extended or adjusted under 35 U.S.C. 154(b) by 58 days.

(21) Appl. No.: 16/207,594

(22) Filed: Dec. 3, 2018

(65) Prior Publication Data
US 2019/0168747 A1    Jun. 6, 2019

(30) Foreign Application Priority Data
Dec. 4, 2017    (JP) .................. 2017-232295

(51) Int. Cl.
*B60W 30/06*    (2006.01)
*B60L 53/14*    (2019.01)

(52) U.S. Cl.
CPC ............ *B60W 30/06* (2013.01); *B60L 53/14* (2019.02); *B60W 2400/00* (2013.01); *B60W 2900/00* (2013.01)

(58) Field of Classification Search
CPC ............ B60W 30/06; B60W 2400/00; B60W 2900/00; B60L 53/14; B60L 53/36; B60L 2250/30; B60L 2250/16; B60L 2260/32; B60L 53/66; B60L 53/37; B60L 2240/70
USPC .......................................................... 701/22
See application file for complete search history.

(56) References Cited

U.S. PATENT DOCUMENTS

| 2011/0140658 A1* | 6/2011 | Outwater | B60L 53/14 320/109 |
| 2011/0213656 A1* | 9/2011 | Turner | B60L 3/12 705/14.49 |
| 2014/0089016 A1* | 3/2014 | Smullin | G06Q 10/02 705/5 |
| 2016/0046194 A1* | 2/2016 | Tsukamoto | B60L 53/12 307/104 |
| 2016/0280077 A1* | 9/2016 | Tsukamoto | B60L 3/0069 |
| 2016/0288665 A1* | 10/2016 | Tsukamoto | B60L 53/126 |
| 2016/0297312 A1* | 10/2016 | Tsukamoto | B60L 53/37 |
| 2017/0008409 A1* | 1/2017 | Roberts | B60L 11/1829 |

FOREIGN PATENT DOCUMENTS

JP    5365349 B2 * 12/2013

* cited by examiner

*Primary Examiner* — Muhammad Shafi
(74) *Attorney, Agent, or Firm* — Oliff PLC

(57) ABSTRACT

A parking assistance control apparatus for assisting parking a vehicle including a charging port that is connectable to electrical supply equipment via a charging cable. In the apparatus, a charging port recognizer is configured to recognize a mounting location of the charging port on the vehicle. An electrical supply equipment recognizer is configured to recognize an installation location of the electrical supply equipment. A parking assistance controller is configured to, based on the mounting location of the charging port on the vehicle and the installation location of the electrical supply equipment, determine a parking manner to park the vehicle, and based on the determined parking manner, perform parking assistance control.

10 Claims, 19 Drawing Sheets

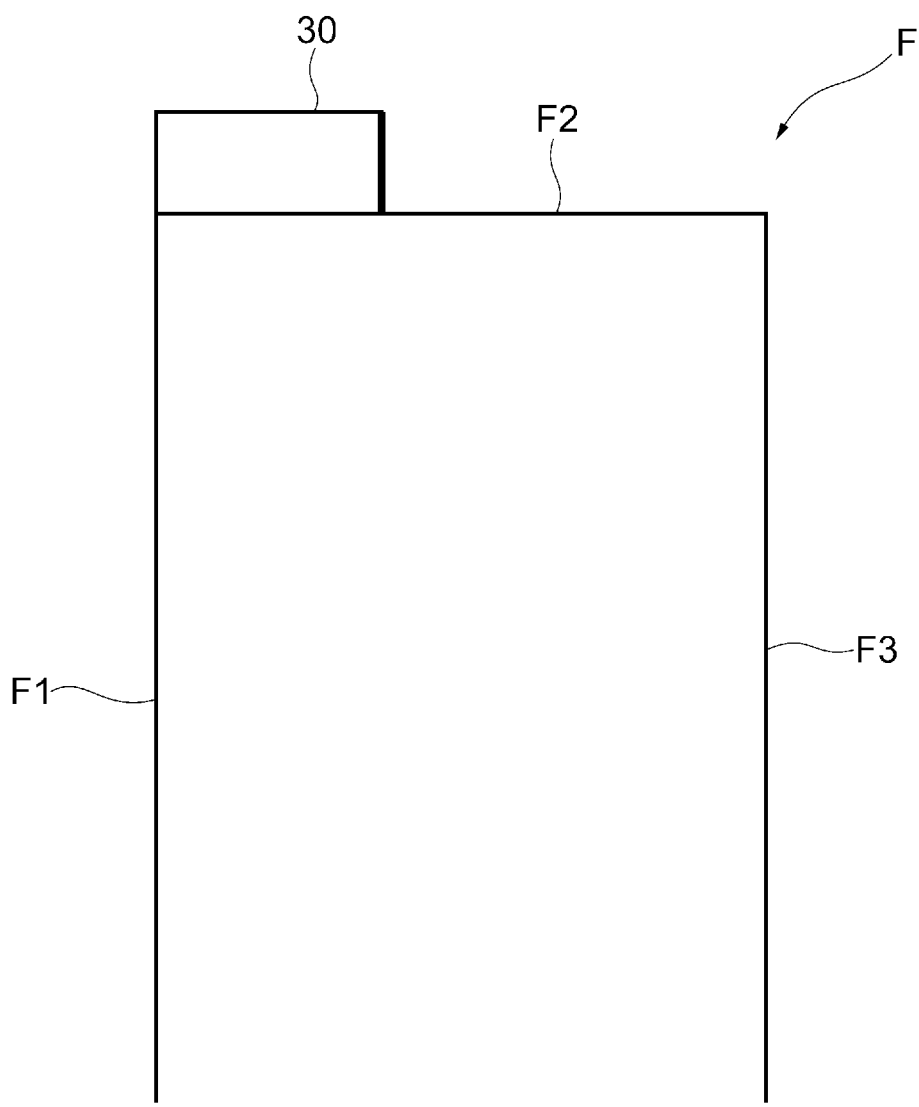

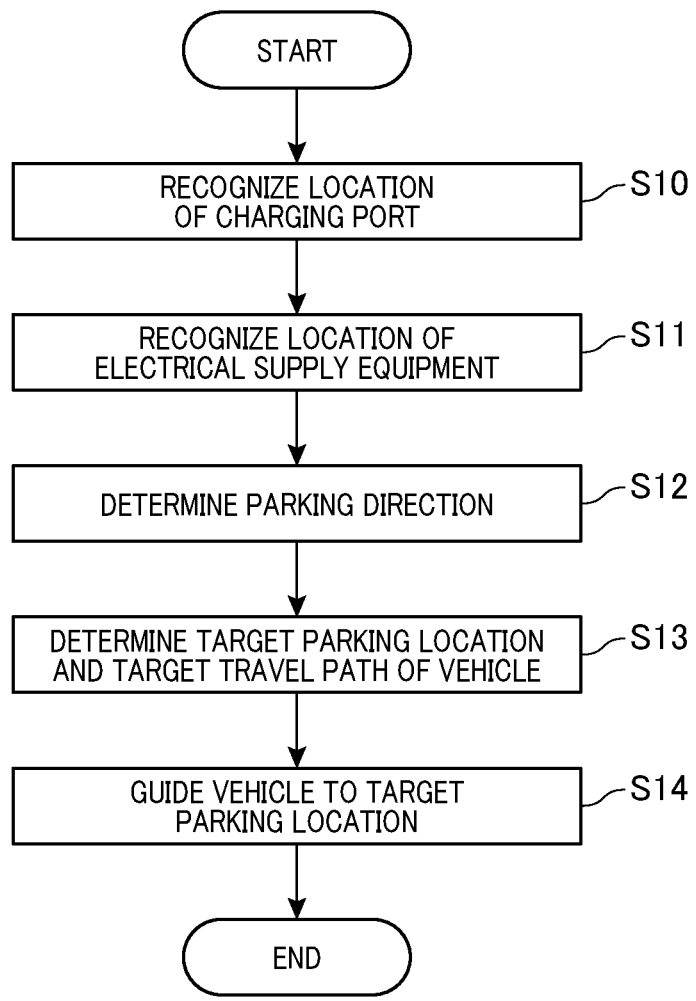

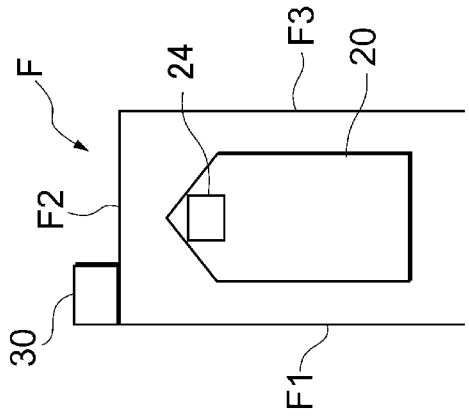
FIG.4A
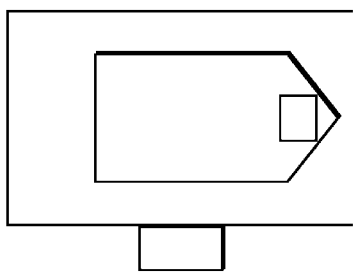
FIG.4B
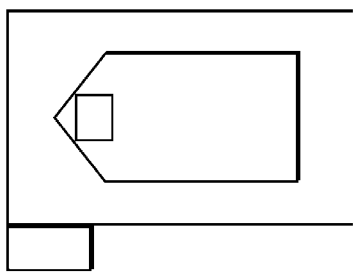
FIG.4C
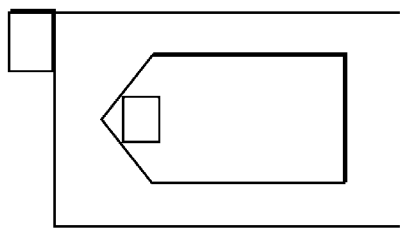
FIG.4D
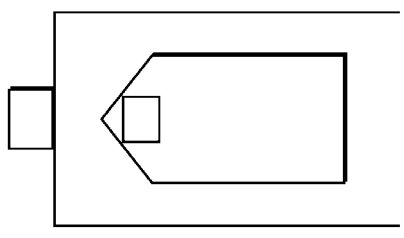
FIG.4E
FIG.4F
FIG.4G
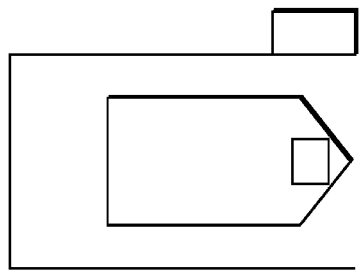
FIG.4H
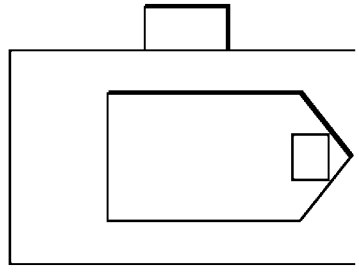
FIG.4I
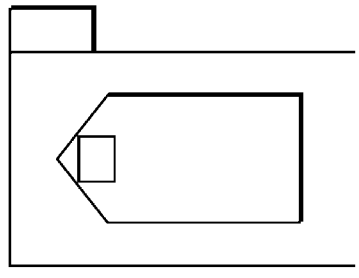
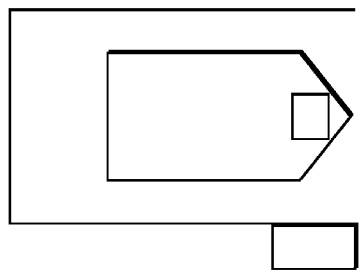

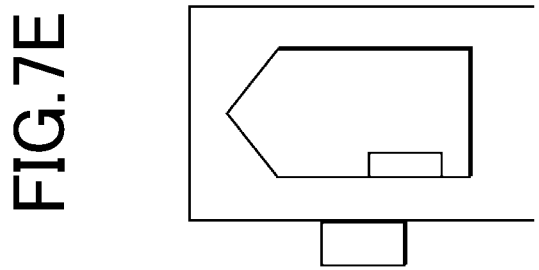
FIG.7E
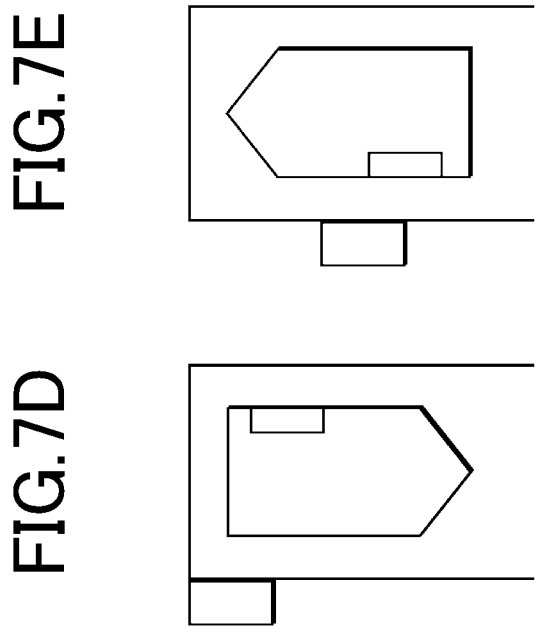
FIG.7D FIG.7C FIG.7B FIG.7A
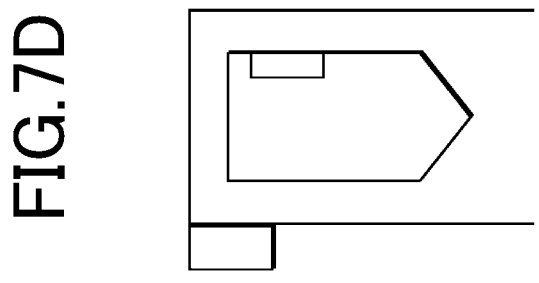
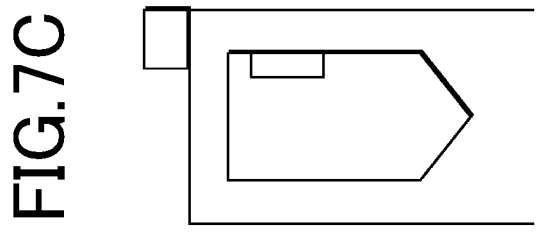
FIG.7F
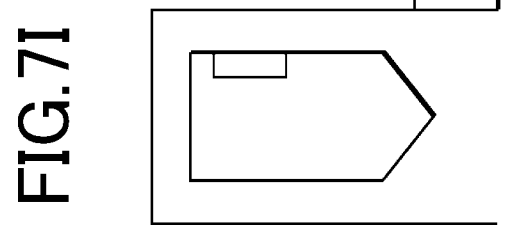
FIG.7I FIG.7H FIG.7G
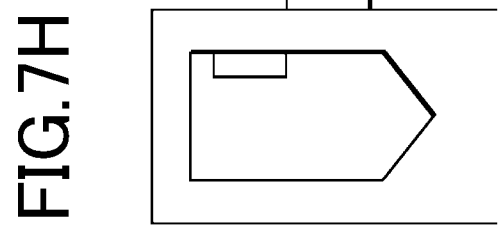
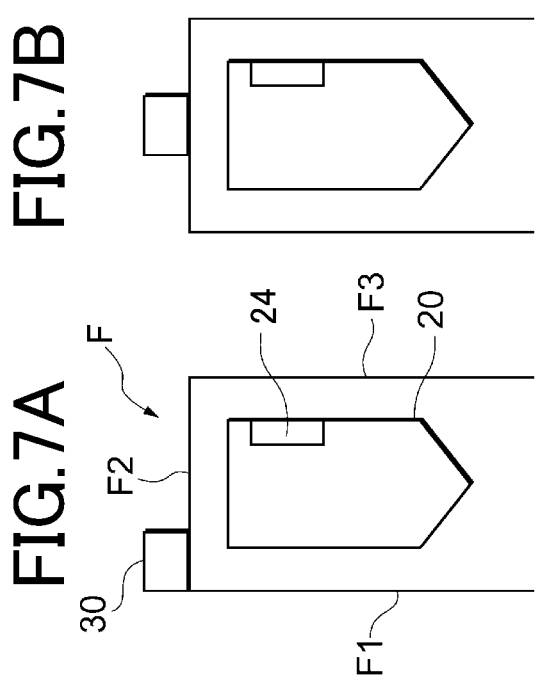
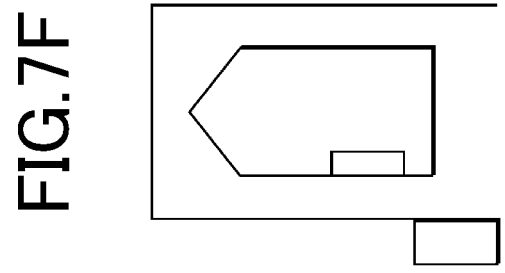

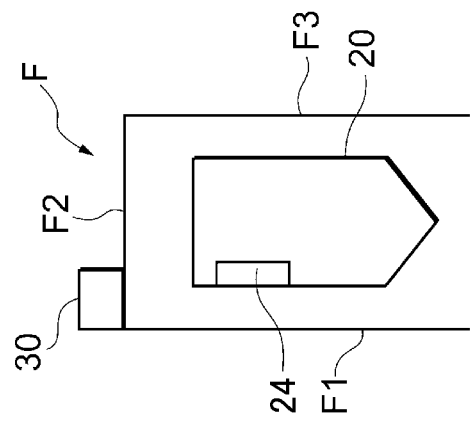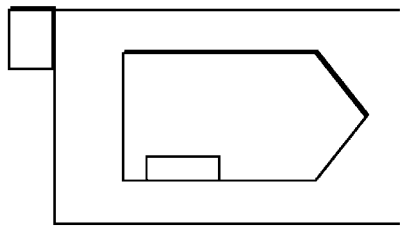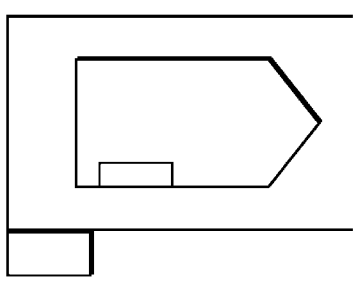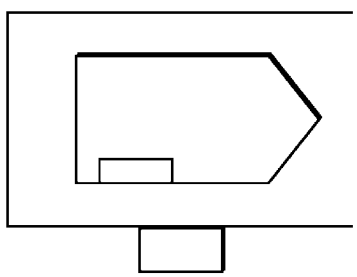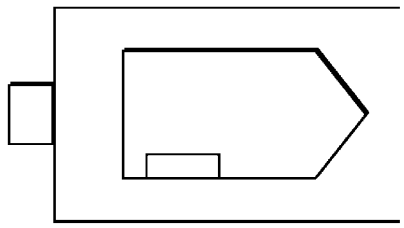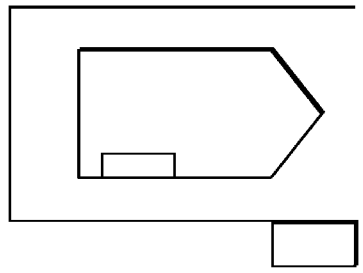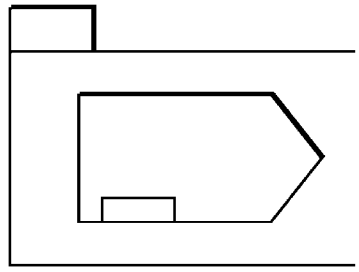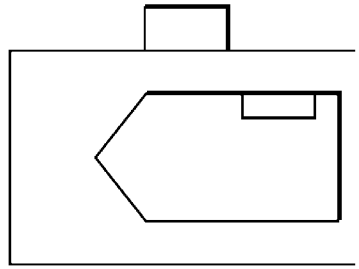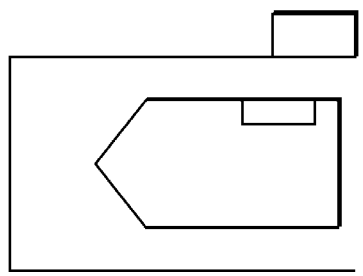

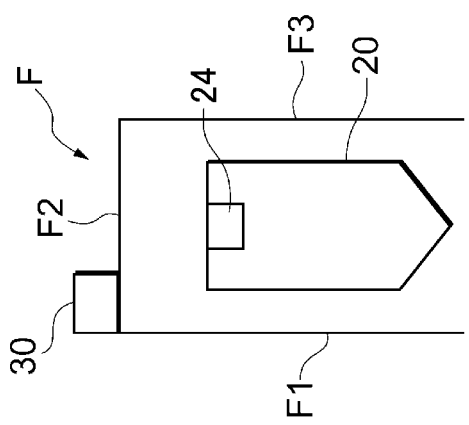
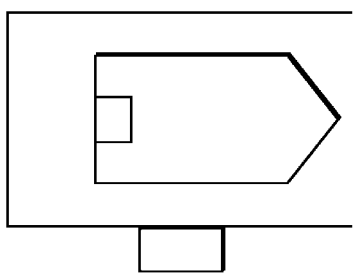
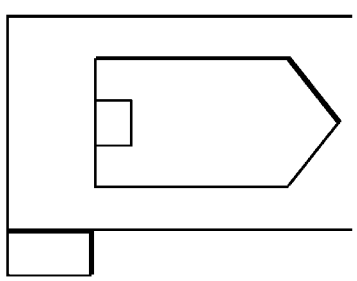
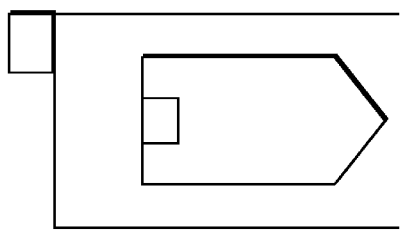
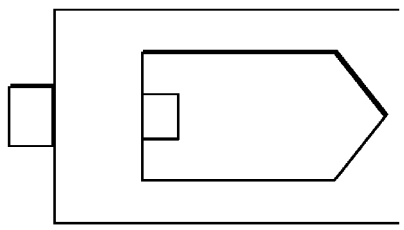
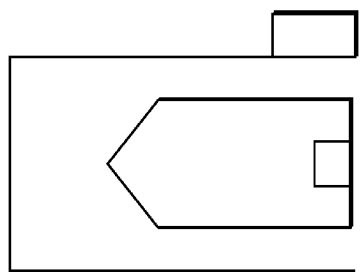
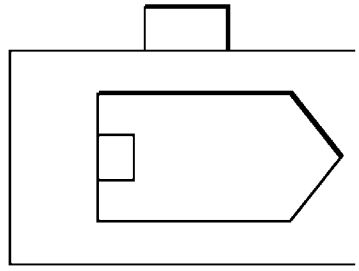
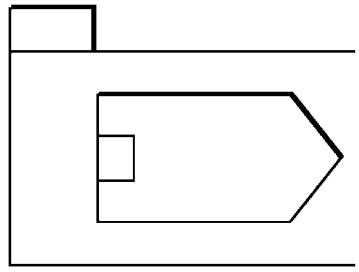
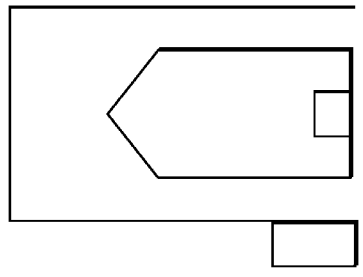

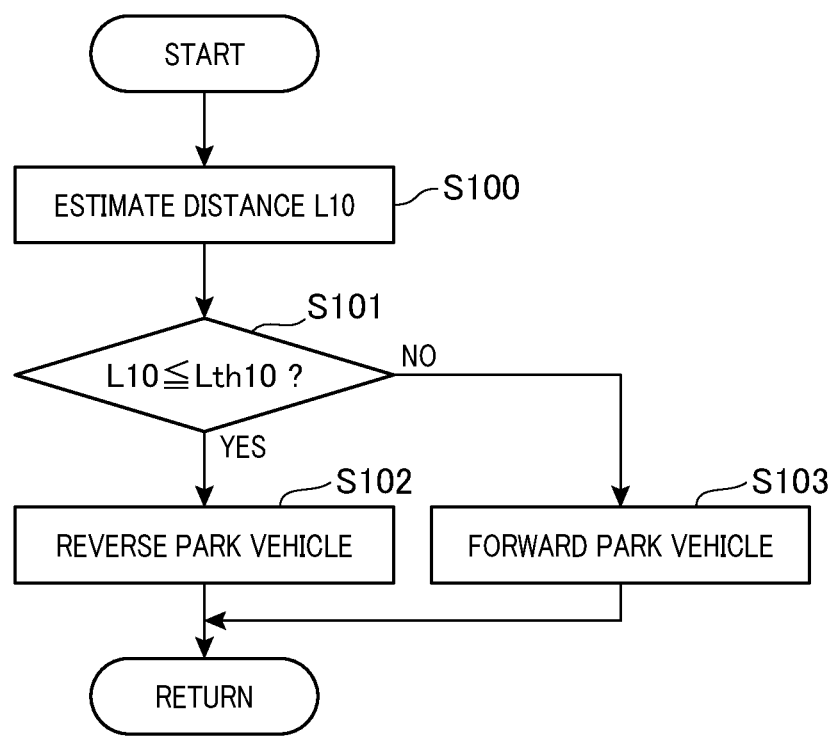

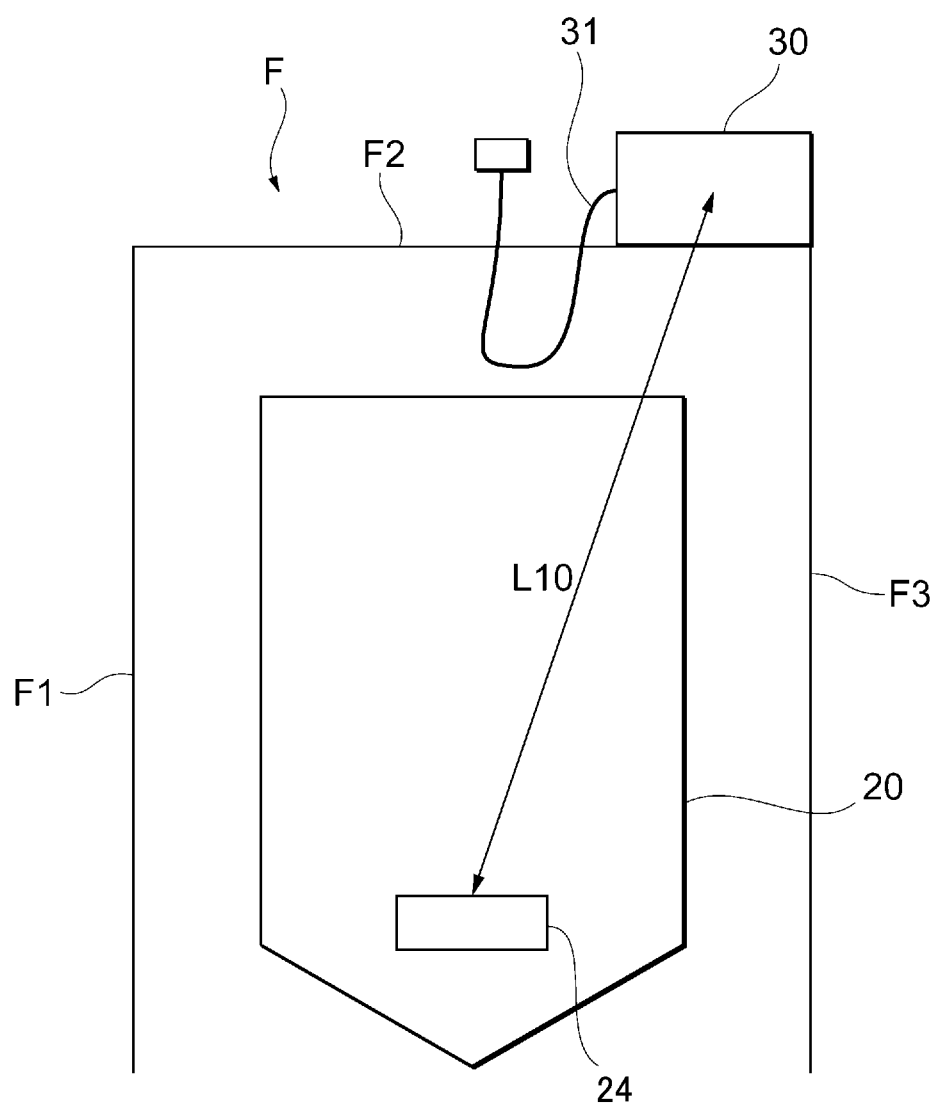

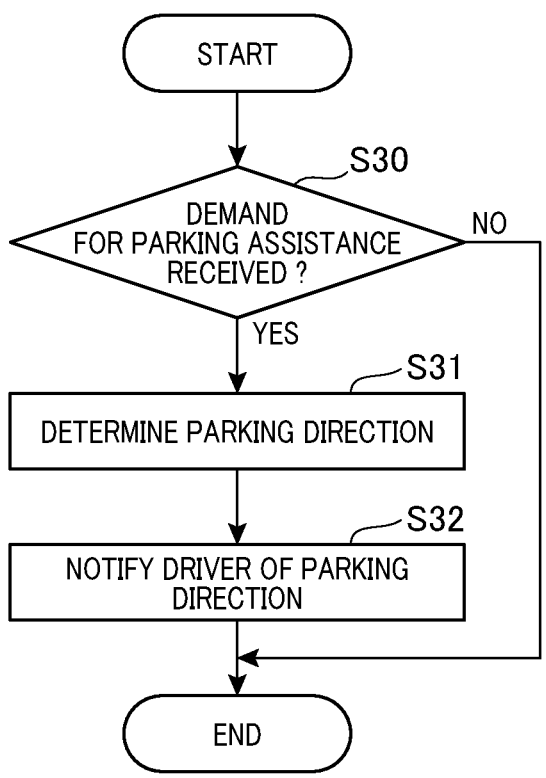

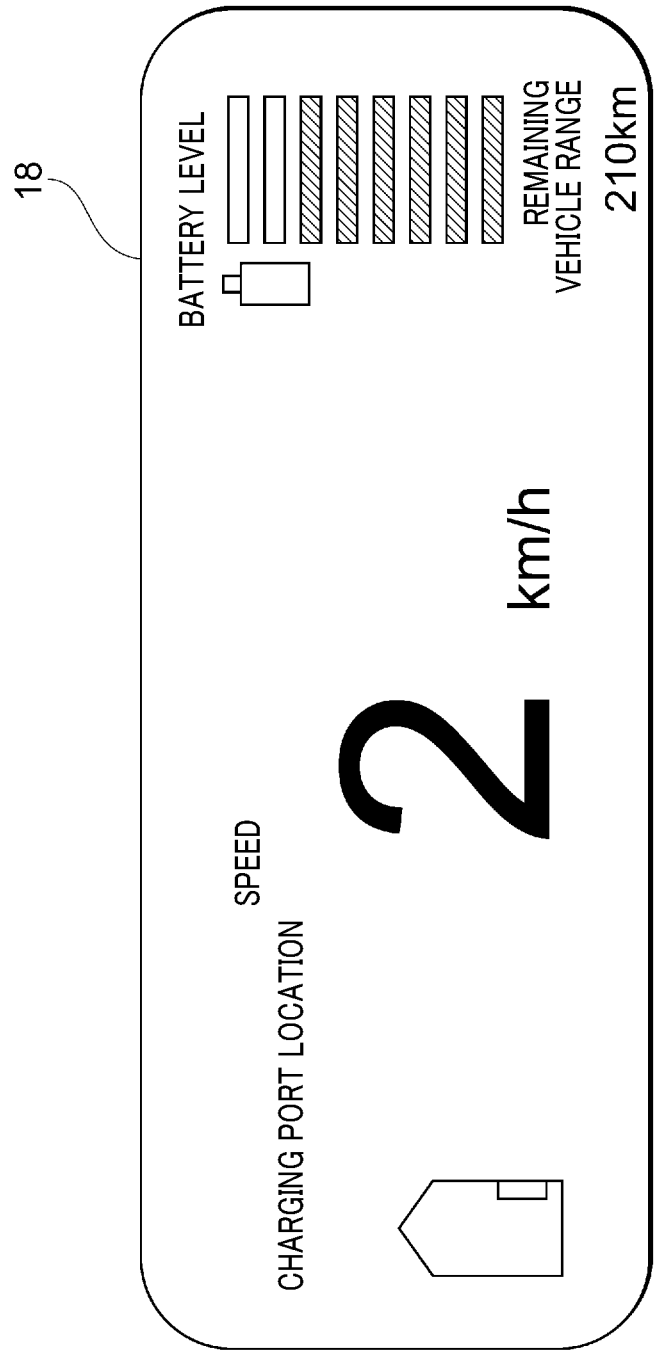

PARKING ASSISTANCE CONTROL APPARATUS

CROSS-REFERENCE TO RELATED APPLICATION

This application is based on and claims the benefit of priority from earlier Japanese Patent Application No. 2017-232295 filed on Dec. 4, 2017, the description of which is incorporated herein by reference.

BACKGROUND

Technical Field

The present disclosure relates to a parking assistance control apparatus.

Related Art

A parking assistance control apparatus disclosed in Japanese Patent No. 5365349 is configured to learn parking locations during manual parking of a vehicle by a driver, and use the learned parking locations during automatic parking of the vehicle, thereby achieving automatic parking according to driver's preferences.

A motor-drivable vehicle, such as an electrical vehicle, a plug-in hybrid vehicle or the like, includes a rechargeable battery to power a motor of the vehicle. In such a vehicle, electrical connection between electrical supply equipment installed in a parking lot and a charging port of the vehicle via a charging cable enables power supply to the battery.

In general, a mounting location of the charging port may vary from vehicle to vehicle. Thus, depending on a parking location at completion of automatic parking of the vehicle conducted by the parking assistance apparatus, a length of the charging cable may be too short to connect the charging port of the vehicle and the electrical supply equipment. In such a case, an occupant of the vehicle may be forced to re-park the vehicle to get the charging port of the vehicle closer to the electrical supply equipment. In addition, in the case of a vehicle that can be automatically driven, there may be assumed a situation where a person having no driving skill or no driving license operates a vehicle. In such a situation, the person is not able to properly move the vehicle, which may make it difficult to charge the battery.

A vehicle that is only be manually driven, but has a function of assisting a driver with driving the vehicle by displaying parking assistance information on a display or audibly outputting the parking assistance information from a speaker may also encounter a similar issue.

In view of the above, it is desired to have a parking assistance control apparatus that can prevent a situation where an occupant is forced to re-park a vehicle.

SUMMARY

One aspect of the disclosure provides a parking assistance control apparatus for assisting parking a vehicle including a charging port that is connectable to electrical supply equipment via a charging cable. The parking assistance control apparatus includes: a charging port recognizer configured to recognize a mounting location of the charging port on the vehicle; an electrical supply equipment recognizer configured to recognize an installation location of the electrical supply equipment; and a parking assistance controller configured to, based on the mounting location of the charging port on the vehicle and the installation location of the electrical supply equipment, determine a parking manner to park the vehicle, and based on the determined parking manner, perform parking assistance control.

This configuration enables parking the vehicle in an optimal parking direction responsive to locations of the charging port on the vehicle and the electrical supply equipment, which can prevent a situation where the vehicle must be reparked.

BRIEF DESCRIPTION OF THE DRAWINGS

FIG. 2 is an example of a positional relationship between a parking slot and electrical supply equipment;

FIG. 3 is a flowchart of processing performed by a parking assistance ECU of the first embodiment;

FIGS. 4A to 4I are maps illustrating an example of a vehicle parking manner of the first embodiment;

FIGS. 7A to 7I are maps illustrating an example of a vehicle parking manner of the first embodiment;

FIGS. 8A to 8I are maps illustrating an example of a vehicle parking manner of the first embodiment;

FIGS. 9A to 9I are maps illustrating an example of a vehicle parking manner of the first embodiment;

FIG. 10 is a flowchart of processing performed by a parking assistance ECU in accordance with a second embodiment of the present disclosure;

FIG. 11 is an example of a vehicle parking manner of the second embodiment;

FIG. 18 is a flowchart of processing performed by a parking assistance ECU in accordance with a sixth embodiment of the present disclosure; and FIG. 19 is a front view of a display unit in accordance with a seventh embodiment of the present disclosure.

DESCRIPTION OF SPECIFIC EMBODIMENTS

Figure 1:
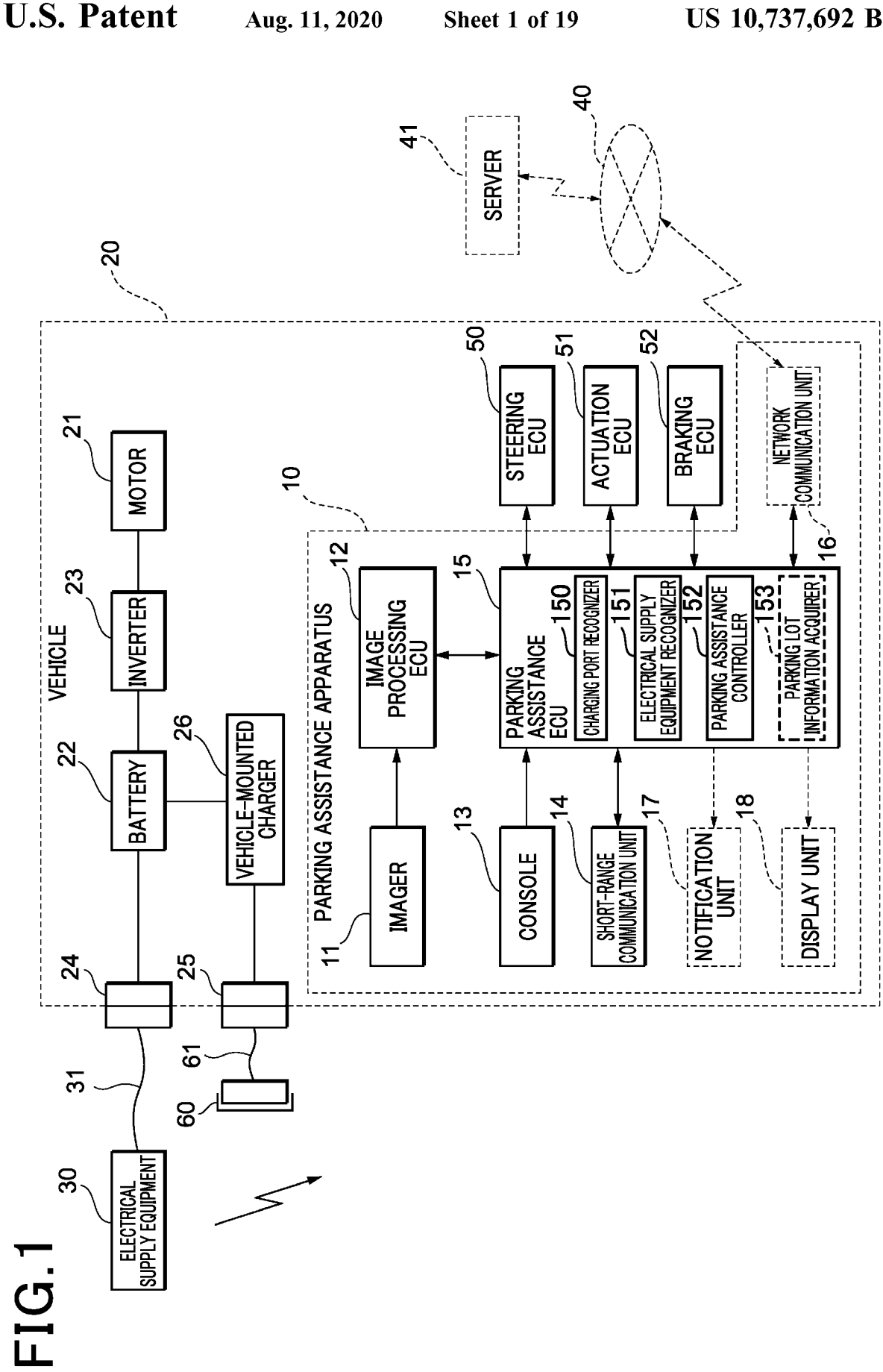
FIG. 1 is a block diagram of a vehicle in accordance with a first embodiment of the present disclosure.
Figure 5E:
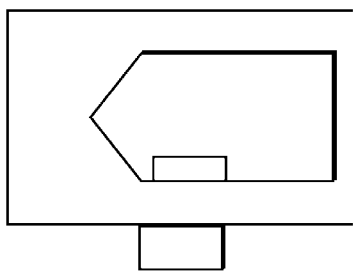
FIGS. 5A to 5I are maps illustrating an example of a vehicle parking manner of the first embodiment.
Figure 5D:
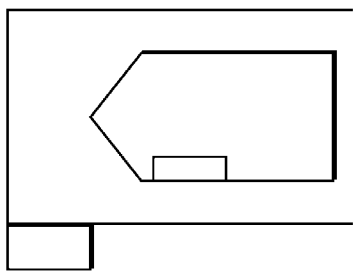
Figure 5C:
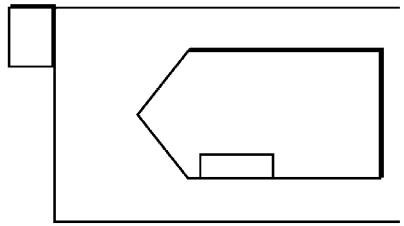
Figure 5B:
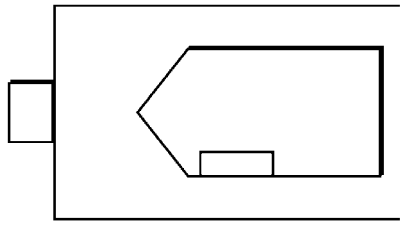
Figure 5A:
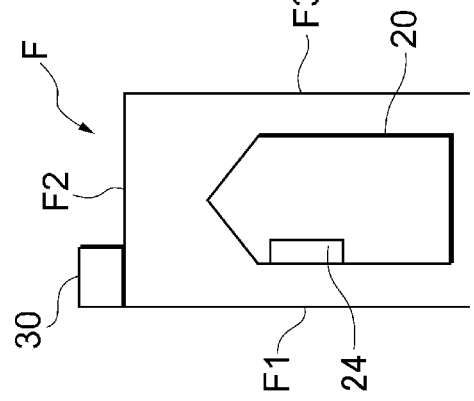
Figure 5I:
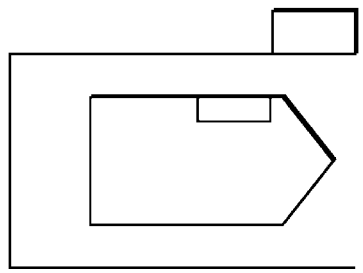
Figure 5H:
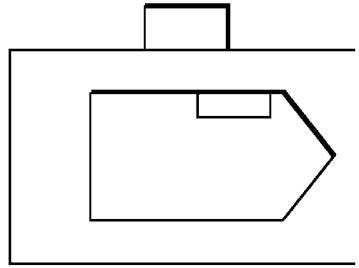
Figure 5G:
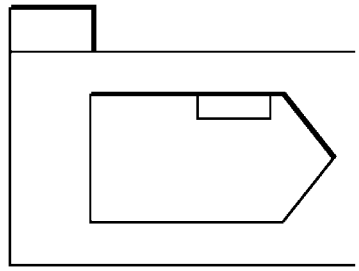
Figure 5F:
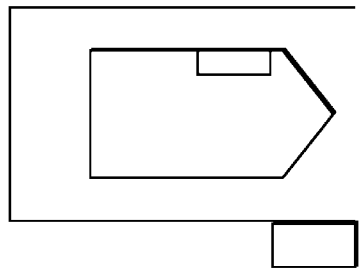
Figure 6E:
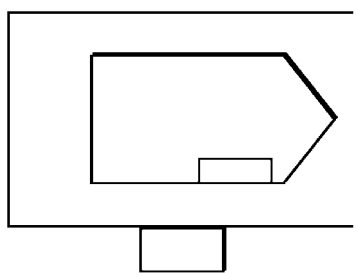
FIGS. 6A to 6I are maps illustrating an example of a vehicle parking manner of the first embodiment.
Figure 6D:
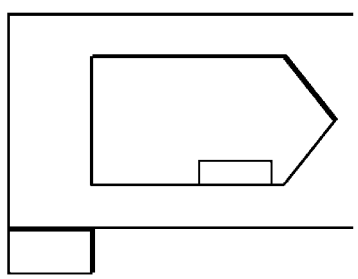
Figure 6C:
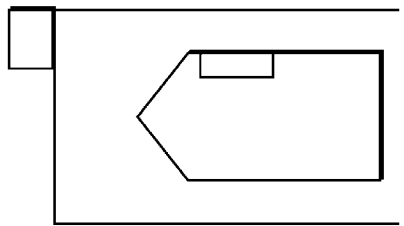
Figure 6B:
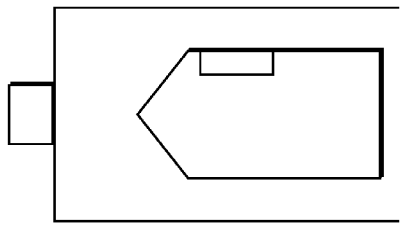
Figure 6A:
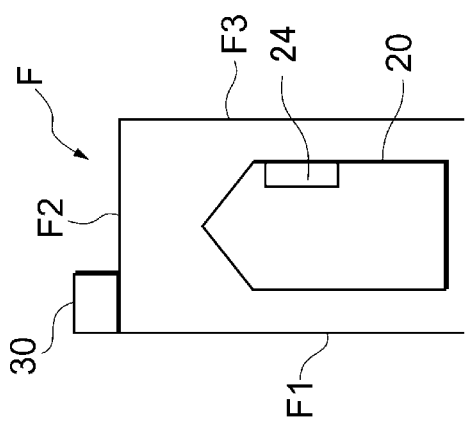
Figure 6I:
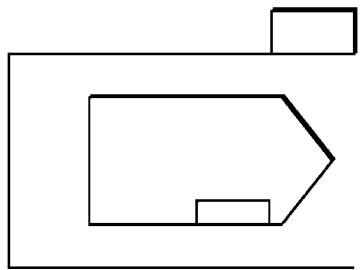
Figure 6H:
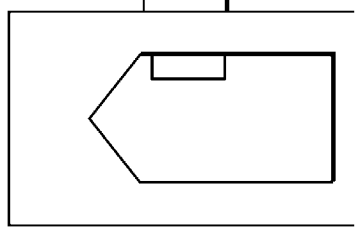
Figure 6G:
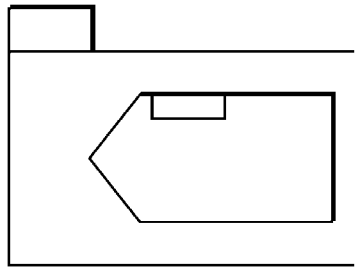
Figure 6F:
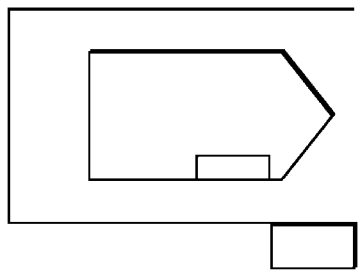

In the following, exemplary embodiments will be described with reference to the accompanying drawings. For easy understanding of the description, the same components are designated with the same reference signs as much as possible in the drawings, and duplicate description will be omitted.

First Embodiment

A schematic of a vehicle 20 carrying a parking assistance apparatus 10 in accordance with a first embodiment of the present disclosure will now be described with reference to FIG. 1.

The vehicle 20 may be a motor-drivable vehicle, such as an electrical vehicle, a plug-in hybrid vehicle or the like, including a rechargeable battery to power a motor of the vehicle. The vehicle 20 includes a battery 22 used to power the motor 21 and an inverter 23 that convers direct-current (DC) power supplied form the battery 22 into alternating-current (AC) power to power the motor 21. The motor 21 is driven by the AC power supplied from the inverter 23 to the motor 21. The vehicle 20 is provided with a charging port 24 that allows for connection to and disconnection from a charging cable 31 for electrical supply equipment 30 and a charging port 25 that allows for connection to and disconnection from a charging cable 61 for a commercially available AC outlet 60. The charging cables 31, 61 are carried by the vehicle 20. In an alternative embodiment, the charging cable 31 may be attached to the electrical supply equipment 30.

To perform normal charging of a battery 22 in the vehicle 20, the charging port 25 on the vehicle 20 is connected to the commercially available AC outlet 60 via the charging cable 61. The vehicle 20 is supplied with alternating-current (AC) power of 100 to 200 volts from the commercially available AC outlet 60. This AC power is converted into direct-current (DC) power by the vehicle-mounted charger 26. The DC power is in turn supplied to the battery 22, thereby charging the battery 22.

To perform rapid charging of the battery 22 in the vehicle 20, the charging port 24 on the vehicle 20 is connected to the electrical supply equipment 30 via the charging cable 31, thereby initiating a supply of power from the electrical supply equipment 30 to the vehicle 20. In an alternative embodiment, a supply of power from the electrical supply equipment 30 to the vehicle 20 may be initiated when the electrical supply equipment 30 undergoes predefined operations after the charging port 24 on the vehicle 20 has been connected to the electrical supply equipment 30 via the charging cable 31. The electrical supply equipment 30 performs voltage adjustment and of conversion and then supplies power to the vehicle 20. Supplying the DC power to the battery 22 via the charging port 24 enables charging the battery 22.

The parking assistance apparatus 10 mounted on the vehicle 20 includes an imager 11, an image processing electronic control unit (ECU) 12, a console 13, and a short-range communication unit 14, and a parking assistance ECU 15.

The imager 11 captures an image of surroundings around the vehicle 20 every predetermined time interval to acquire image data of the surroundings of the vehicle. The imager 11 transmits the image data to the image processing ECU 12 every predetermined time interval.

The image processing ECU 12 may be configured as a microcomputer including a central processing unit (CPU), a random-access memory (RAM), a read-only memory (ROM), and a non-volatile memory (e.g., EEPROM). The image processing ECU 12 performs various types of processing on image data received from the imager 11 by executing programs pre-stored in the ROM. For example, the image processing ECU 12 processes the image data to acquire location information for the parking slot and the electrical supply equipment 30 included in the image data.

The console 13 can be operated by an occupant of the vehicle 20. The console 13 includes push buttons to be operated when automatically parking the vehicle 20. The console 13 transmits operation signals responsive to vehicle occupant's operations to the parking assistance ECU 15.

The short range communication unit 14 is configured to receive a recognition signal transmitted from the electrical supply equipment 30 and the like. The recognition signal may include only information indicating that an originator of the recognition signal is the electrical supply equipment 30 or may include not only information indicating that an originator of the recognition signal is the electrical supply equipment 30, but also location information indicating a location of the electrical supply equipment 30 relative to a parking slot. For example, assuming that, as shown in FIG. 2, the parking slot F is defined by three sides F1 to F3, the location information for the electrical supply equipment 30 indicates a location of the electrical supply equipment 30 relative to locations of the three sides F1 to F3. As shown in FIG. 1, the short range communication unit 14 transmits the received recognition signal to the parking assistance ECU 15.

The parking assistance ECU 15 is configured as a microcomputer including a central processing unit (CPU) and a read-only memory (ROM), a random-access memory (RAM), and a nonvolatile memory. The parking assistance ECU 15 performs automatic parking control for automatically parking the vehicle 20 by the CPU executing programs pre-stored in the ROM. In the present embodiment, this automatic parking control corresponds to parking assistance control for assisting a driver with parking the vehicle 20. The parking assistance ECU 15 corresponds to a parking assistance control apparatus. The parking assistance ECU 15 includes a charging port recognizer 150 configured to recognize a mounting location of the charging port 24 on the vehicle 20, an electrical supply equipment recognizer 151 configured to recognize an installation location of the electrical supply equipment 30, and a parking assistance controller 152 configured to perform automatic parking control based on the mounting location of the charging port 24 recognized by the charging port recognizer 150 and the location of the electrical supply equipment 30 recognized by the electrical supply equipment recognizer 151.

Automatic parking control processing performed by the parking assistance ECU 15 will now be described with reference to FIG. 3. The parking assistance ECU 15 is configured to initiate the processing shown in FIG. 3 upon detecting occupant's operations on the console 13 to initiate automatic parking in response to an operation signal transmitted from the console 13.

As shown in FIG. 3, at step S10, the charging port recognizer 150 recognizes a mounting location of the charging port 24 on the vehicle 20. More specifically, location information for the charging port 24 on the vehicle 20 is pre-stored in the nonvolatile memory of the parking assistance ECU 15. Based on this information, the charging port recognizer 150 recognizes a mounting location of the charging port 24 on the vehicle 20. The mounting location of the charging port 24 on the vehicle 20 is pre-stored in the nonvolatile memory of the parking assistance ECU 15 as location information represented by coordinates in a two dimensional coordinate system having the origin at the center of the vehicle 20, the abscissa in a lateral direction of the vehicle 20, and the ordinate in a longitudinal direction of the vehicle 20. In a case where the image processing ECU 12 is able to recognize a mounting location of the charging port 24 on the vehicle 20 from image data acquired by the imager 11, the charging port recognizer 150 may use this mounting location of the charging port 24 recognized by the image processing ECU 12.

At step S11 subsequent to step S10, the electrical supply equipment recognizer 151 recognizes an installation location of the electrical supply equipment 30. More specifically, the electrical supply equipment recognizer 151 receives, via the short range communication unit 14, a recognition signal transmitted from the electrical supply equipment 30, and based on this recognition signal, recognizes an installation location of the electrical supply equipment 30.

For example, in a case where the recognition signal may include only information indicating that an originator of the recognition signal is the electrical supply equipment 30, the electrical supply equipment recognizer 151 can detect a relative distance and a relative location of the electrical supply equipment 30 based on a transmission direction of the recognition signal. In this case, the electrical supply equipment recognizer 151 fuses information on the relative distance and the relative location of the electrical supply equipment 30 relative to the vehicle 20 and parking slot information that can be acquired from the image processing ECU 12, thereby recognizing an installation location of the electrical supply equipment 30 relative to the parking slot F as shown in FIG. 2.

In another case where the recognition signal includes not only information indicating that an originator of the recognition signal is the electrical supply equipment 30, but also location information indicating a location of the electrical supply equipment 30 relative to a parking slot, the electrical supply equipment recognizer 151 recognizes an installation location of the electrical supply equipment 30 relative to the parking slot F as shown in FIG. 2.

At step S12 subsequent to step S11, the parking assistance controller 152 determines a parking direction for the vehicle 20, that is, whether to forward park or reverse park the vehicle 20. In the present embodiment, this parking direction for the vehicle 20 corresponds to a parking manner of the vehicle 20.

More specifically, maps as shown in FIGS. 4A to 4I, FIGS. 5A to 5I, FIGS. 6A to 6I, FIG. 7A to 7I, FIG. 8A to 8I, and FIG. 9A to 9I are pre-stored in the nonvolatile memory of the parking assistance controller 152. These maps show which one of forward parking and reverse parking vehicle 20 should be selected as a parking direction to reduce a distance between the charging port 24 and the electrical supply equipment 30 at completion of parking of the vehicle 20. That is, these maps show an optimal parking direction for the vehicle 20 in response to locations of the charging port 24 on the vehicle 20, the parking slot F, and the electrical supply equipment 30.

For example, in a case where the charging port 24 is mounted at a forward location of the vehicle 20 and the electrical supply equipment 30 is installed at the left end of the distal side F2 of the parking slot F as shown in FIG. 4A, forward parking of the vehicle 20 is determined as a parking direction for the vehicle 20. In a case where the charging port 24 is mounted at a forward location of the vehicle 20 and the electrical supply equipment 30 is installed at the proximal end of the left side F1 of the parking slot F as shown in FIG. 4F, reverse parking of the vehicle 20 is determined as a parking direction for the vehicle 20. The word "proximal" refers to a direction relatively closer to the vehicle 20. The word "distal" refers to a direction relatively far from the vehicle 20.

FIGS. 4A to 4I illustrate maps used to determine a parking direction for the vehicle 20 in cases where the charging port 24 is mounted at a forward location of the vehicle 20. FIGS. 5A to 5I illustrate maps used to determine a parking direction for the vehicle 20 in cases where the charging port 24 is mounted at a leftward forward location of the vehicle 20. FIGS. 6A to 6I illustrate maps used to determine a parking direction for the vehicle 20 in cases where the charging port 24 is mounted at a rightward forward location of the vehicle 20. FIGS. 7A to 7I illustrate maps used to determine a parking direction for the vehicle 20 in cases where the charging port 24 is mounted at a leftward rearward location of the vehicle 20. FIGS. 8A to 8I illustrate maps used to determine a parking direction for the vehicle 20 in cases where the charging port 24 is mounted at a rightward rearward location of the vehicle 20. FIGS. 9A to 9I illustrates maps used to determine a parking direction for the vehicle 20 in cases where the charging port 24 is mounted at a rearward location of the vehicle 20.

According to the maps shown in FIGS. 4E, 4H, 5F, 5G, 6D, 6I, 7D, 7I, 8F, 8G, 9E, and 9H, reverse parking of the vehicle 20 is selected looking ahead to next starting of the vehicle 20 from the point of view of easiness to confirm the safety or the like. In an alternative embodiment, forward parking may be selected in these cases.

As shown in FIG. 3, at step S13 subsequent to step S12, the parking assistance controller 152 determines a target parking location and a target travel path of the vehicle 20 based on the parking direction for the vehicle 20 determined at step S12. More specifically, the parking assistance controller 152 determines a target parking location of the vehicle 20 based on information for the parking slot F acquired from the image processing ECU 12. For example, the target parking location of the vehicle 20 may be set to the center of the parking slot F. The parking assistance controller 152 calculates a target travel path for the vehicle 20 to travel from the current location to the target parking location determined at step S12.

At step S14 subsequent to step S13, the parking assistance controller 152 performs cruise control to guide the vehicle 20 to the target parking location set at step S13. More specifically, as shown in FIG. 1, the parking assistance controller 152 transmits a command signal to the steering ECU 50, the actuation ECU 51, and the braking ECU 52 of the vehicle 20 to control traveling of the vehicle 20, thereby automatically guiding the vehicle 20 to the target parking location along the target travel path set at step S13. The steering ECU 50 is configured to control steering of the vehicle 20. The actuation ECU 51 is configured to control actuation of the motor 21 of the vehicle 20 and forward motion and reverse motion of the vehicle 20. The braking ECU 52 is configured to control braking of the vehicle 20. The parking assistance controller 152 transmits a command signal to these ECUs 50 to 51 to control steering, forward motion, reverse motion, and braking of the vehicle 20, thereby implementing the automatic parking of the vehicle 20.

The present embodiment can provide the following advantage.

(A1) The parking assistance controller 152 is configured to, based on a mounting location of the charging port 24 on the vehicle 20 and an installation location of the electrical supply equipment 30, determine a parking manner of the vehicle 20, more specifically, a parking direction for the vehicle 20, that is, whether to forward park or reverse park the vehicle 20, and based on the parking direction for the vehicle 20, perform parking assistance control to assist parking of the vehicle 20. The parking assistance controller 152 determines whether to forward park or reverse park the vehicle 20 as a parking direction, enabling parking the vehicle in an optimal parking direction responsive to the locations of the charging port 24 and the electrical supply equipment 30. This configuration can obviate a situation where the charging cable 31 is too short to reach the charging port 24 at completion of parking of the vehicle 20, thus causing the vehicle to be reparked. In addition, this configuration can reduce a length of the charging cable 31, thereby reducing the amount of copper cables and losses in the charging cable 31.

Second Embodiment

A second embodiment will now be described. Only differences of the second embodiment from the first embodiment will be described.

The parking assistance apparatus 10 of the present embodiment is configured to normally reverse park the vehicle 20 during automatic parking control, and if a length of the charging cable 31 is too short to reverse park the vehicle 20, then forward park the vehicle 20.

More specifically, at step S12 shown in FIG. 3, the parking assistance controller 152 performs processing shown in FIG. 10. As shown in FIG. 10, the parking assistance controller 152, at step S100, estimates a distance L10 between the charging port 24 on the vehicle 20 and the electrical supply equipment 30 assuming that reverse parking of the vehicle 20 has been completed. More specifically, as shown in FIG. 11, the parking assistance controller 152 acquires information for the parking slot F from the image processing ECU 12, and based on the acquired information for the parking slot F, sets a target parking location of the vehicle 20 to reverse park the vehicle 20. Then, assuming that the vehicle 20 has traveled to the target parking location, the parking assistance controller 152 estimates a location of the charging port 24 based on the information on the location of the charging port 24 on the vehicle 20 acquired at step S10 of FIG. 3 and the target parking location of the vehicle 20. That is, the parking assistance controller 152 estimates a location of the charging port 24 at completion of reverse parking of the vehicle 20. The parking assistance controller 152 calculates a distance L10 between the charging port 24 and the electrical supply equipment 30 as shown in FIG. 11 based on the information on the location of the electrical supply equipment 30 acquired at step S11 of FIG. 3 and the estimated location of the charging port 24 at completion of reverse parking of the vehicle 20.

As shown in FIG. 10, at step S101 subsequent to step S100, the parking assistance controller 152 determines whether or not the distance L10 is equal to or less than a distance threshold Lth10. The distance threshold Lth10 is set equal to or less than an actual length of the charging cable 31. Information on the distance threshold Lth10 may be pre-stored in the nonvolatile memory of the parking assistance ECU 15 or may be acquired by the parking assistance ECU from the electrical supply equipment 30 via wireless communications.

If at step S101 it is determined that the distance L10 is equal to or less than the distance threshold Lth10, the parking assistance controller 152 determines that the charging cable 31 can reach the charging port 24 during reverse parking of the vehicle 20 and determines to reverse park the vehicle 20 at step S102. If at step S101 it is determined that the distance L10 is greater than the distance threshold Lth10, the parking assistance controller 152 determines that the charging cable 31 cannot reach the charging port 24 during reverse parking of the vehicle 20 and determines to forward park the vehicle 20 at step S103.

When comparing the distance L10 and the distance threshold Lth10, the distance L10 may be corrected taking into account routing of the charging cable 31. More specifically, the distance L10 may be multiplied by a predetermined value, or a predetermined value may be added to the distance L10.

The present embodiment can provide the following advantage in addition to the advantage of the first embodiment.

(A2) The parking assistance controller 152 is configured to, based on a location of the charging port 24 at completion of parking of the vehicle 20, an installation location of the electrical supply equipment 30, and a length of the charging cable 31, determine a parking direction for the vehicle 20. More specifically, the parking assistance controller 152 has a distance threshold Lth10 that is set based on the length of the charging cable 31. The parking assistance controller 152 determines a parking direction for the vehicle 20 during automatic parking control, based on whether or not the distance L10 between an estimated location of the charging port 24 at completion of reverse parking of the vehicle 20 and the location of the electrical supply equipment 30 is equal to or less than the distance threshold Lth10. With this configuration, a more proper parking direction for the vehicle 20 can be determined taking into account the length of the charging cable 31. Therefore, this configuration can more reliably obviate a situation where the charging cable 31 is too short to reach the charging port 24 on the vehicle 20 at completion of parking of the vehicle 20 and thus the battery 22 cannot be charged. In addition, this configuration can reduce the length of the charging cable 31, thereby reducing the amount of copper cables and losses in the charging cable 31.

First Modification

A first modification to the second embodiment will now be described.

The parking assistance apparatus 10 of the first modification is configured such that whether to forward park or reverse park the vehicle 20 can be arbitrary set by an occupant of the vehicle 20 operating the console 13. In this configuration of the parking assistance apparatus 10, the vehicle 20 is normally to be parked in a parking direction set by the occupant. If the charging cable 31 is too short to reach the charging port 24 at completion of parking of the vehicle 20 in the parking direction set by the occupant, the vehicle 20 is to be parked in a parking direction opposite to the parking direction set by the occupant.

Figure 12:
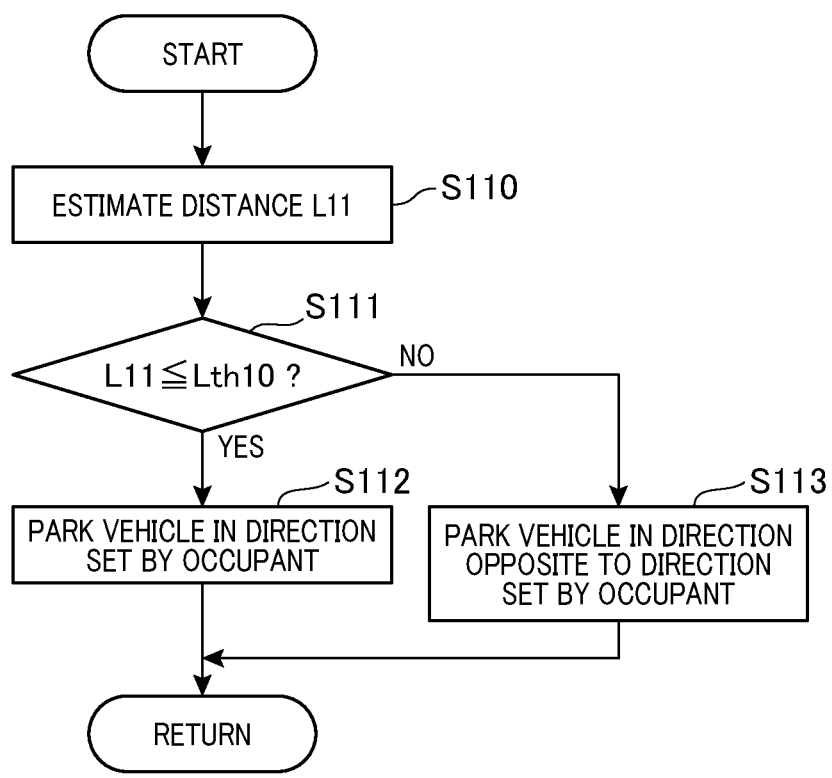
FIG. 12 is a flowchart of processing performed by a parking assistance ECU in accordance with a first modification to the second embodiment.

More specifically, at step S12 shown in FIG. 3, the parking assistance controller 152 performs processing shown in FIG. 12. As shown in FIG. 12, at step S110, assuming that parking of the vehicle 20 in the parking direction set by the occupant has been completed, then the parking assistance controller 152 estimates a distance L11 between the charging port 24 on the vehicle 20 and the electrical supply equipment 30. Subsequently, at step S111, the parking assistance controller 152 determines whether or not the distance L11 is equal to or less than the distance threshold Lth10.

If at step S111 it is determined that the distance L11 is equal to or less than the distance threshold Lth10, the parking assistance controller 152 determines that the charging cable 31 can reach the charging port 24 during parking of the vehicle 20 in the direction set by the occupant, and at step S112, determines to park the vehicle 20 in the parking direction set by the occupant. If at step S111 it is determined that the distance L11 is greater than the distance threshold Lth10, the parking assistance controller 152 determines that the charging cable 31 cannot reach the charging port 24 during parking of the vehicle 20 in the direction set by the occupant, and at step S113, determines to park the vehicle 20 in a direction opposite to the direction set by the occupant. In such a case, the parking assistance controller 152 may provide to the occupant of the vehicle 20 a notification that the vehicle 20 is to be parked in in a direction opposite to the direction set by the occupant, via a notification unit 17 as indicated by a dashed line in FIG. 1. The notification unit 17 may include a speaker, a display or the like.

With this configuration, the vehicle 20 can be parked preferentially in a direction set by the occupant, which can improve convenience.

Second Modification

A second modification to the second embodiment will now be described.

Figure 13:
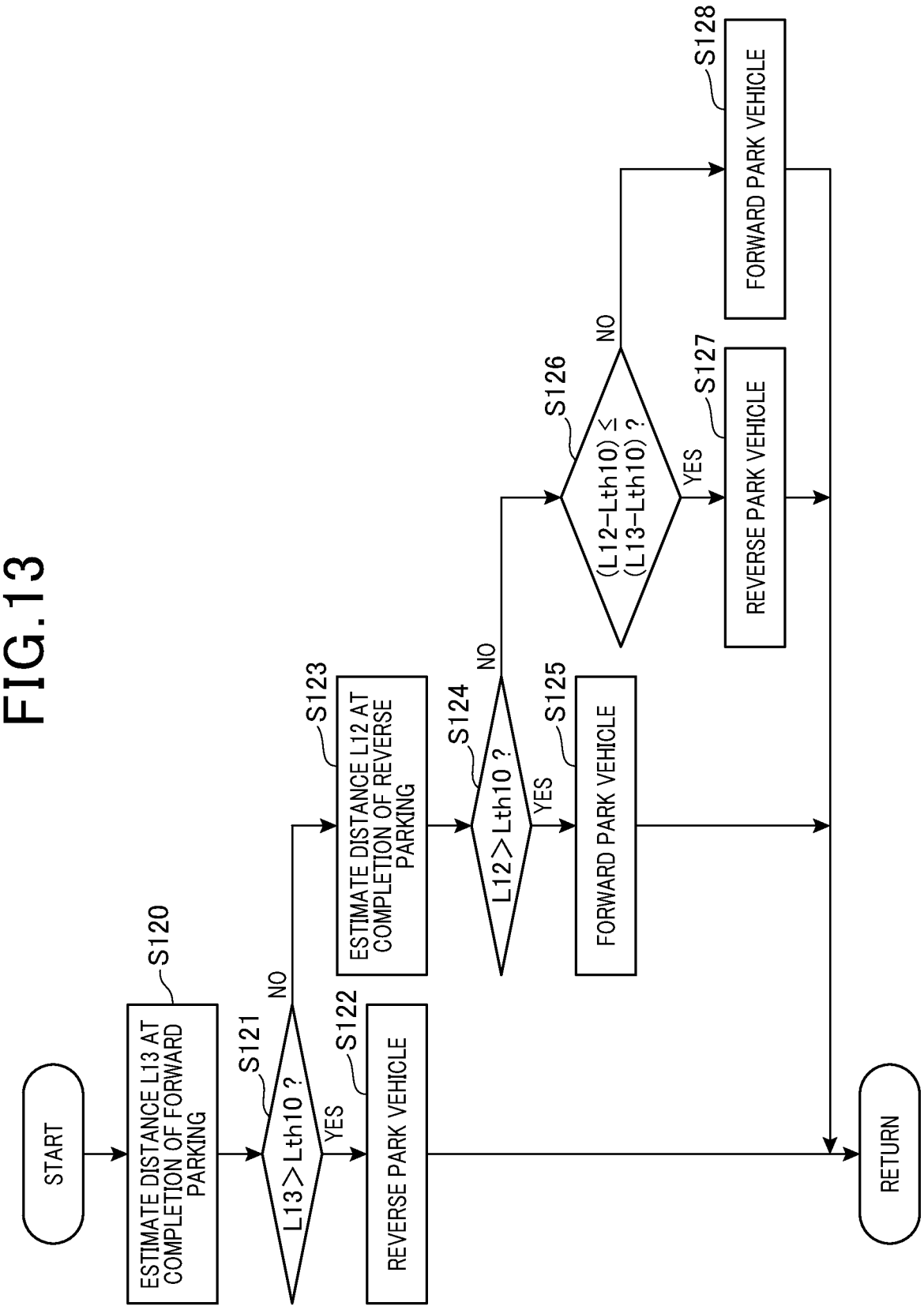
FIG. 13 is a flowchart of processing performed by a parking assistance ECU in accordance with a second modification to the second embodiment.

The parking assistance controller 152, at step S12 shown in FIG. 3, performs processing shown in FIG. 13. As shown in FIG. 13, the parking assistance controller 152, at step S120, estimates a distance L13 between the charging port 24 on the vehicle 20 and the electrical supply equipment 30 assuming that forward parking of the vehicle 20 has been completed. Subsequently, at step S121 subsequent to step S120, the parking assistance controller 152 determines whether or not the distance L13 is greater than the distance threshold Lth10. If at step S121 it is determined that the distance L13 is greater than the distance threshold Lth10, the parking assistance controller 152 determines that the charging cable 31 cannot reach the charging port 24 during forward parking of the vehicle 20. In this case, at step S122, the parking assistance controller 152 determines to reverse park the vehicle 20.

If at step S121 it is determined that the distance L13 is equal to or less than the distance threshold Lth10, then at step S123 the parking assistance controller 152 estimates a distance L12 between the charging port 24 on the vehicle 20 and the electrical supply equipment 30 assuming that reverse parking of the vehicle 20 has been completed. At step S124 subsequent to step S123, the parking assistance controller 152 determines whether or not the distance L12 is greater than the distance threshold Lth10. If at step S124 it is determined that the distance L12 is greater than the distance threshold Lth10, the parking assistance controller 152 determines that the charging cable 31 cannot reach the charging port 24 during reverse parking of the vehicle 20. In this case, at step S125, the parking assistance controller 152 determines to forward park the vehicle 20.

The distance threshold Lth10 used at each of determination steps S121, S124, S126 may be different depending on whether the vehicle is forward or reverse parked. In any case, the distance threshold Lth10 may be set such that the charging cable 31 can be routed along the circumference of the vehicle 20 from the electrical supply equipment 30 to the charging port 24.

If at step S124 it is determined that the distance L12 is equal to or less than the distance threshold Lth10, then whether in the case of forward parking or in the case of reverse parking, the parking assistance controller 152 determines that the charging cable 31 can reach the charging port 24. In this case, at step S126, the parking assistance controller 152 determines whether or not L12 minus Lth10 is equal to or less than Lth13 minus Lth10. If at step S126 it is determined that L12 minus Lth10 is equal to or less than Lth13 minus Lth10, where the charging cable 31 is more likely to reach the charging port 24 in the case of reverse parking than in the case of the forward parking, then at step S127 the parking assistance controller 152 determines to reverse park the vehicle 20. If at step S126 it is determined that L12 minus Lth10 is greater than Lth13 minus Lth10, where the charging cable 31 is more likely to reach the charging port 24 in the case of forward parking than in the case of the reverse parking, then at step S128 the parking assistance controller 152 determines to forward park the vehicle 20.

This configuration can more reliably obviate a situation where the charging cable 31 is too short to reach the charging port 24 at completion of parking of the vehicle 20. In addition, the length of the charging cable 31 can be reduced, which can reduce the amount of copper cables and losses in the charging cable 31. Further, a distance between the electrical supply equipment 30 and the charging port 24 can be reduced, which allows the charging cable 31 to be more readily routed.

Third Embodiment

A third embodiment will now be described. Only differences of the third embodiment from the first embodiment will be described.

The parking assistance controller 152 of the present embodiment determines a shorter one of a distance between the charging port 24 and the electrical supply equipment 30 at completion of forward parking of the vehicle 20 and a distance between the charging port 24 on the vehicle 20 and the electrical supply equipment 30 at completion of reverse parking of the vehicle 20, and based on the determination result, determines a parking direction, that is, whether to forward park or reverse park the vehicle 20.

Figure 14:
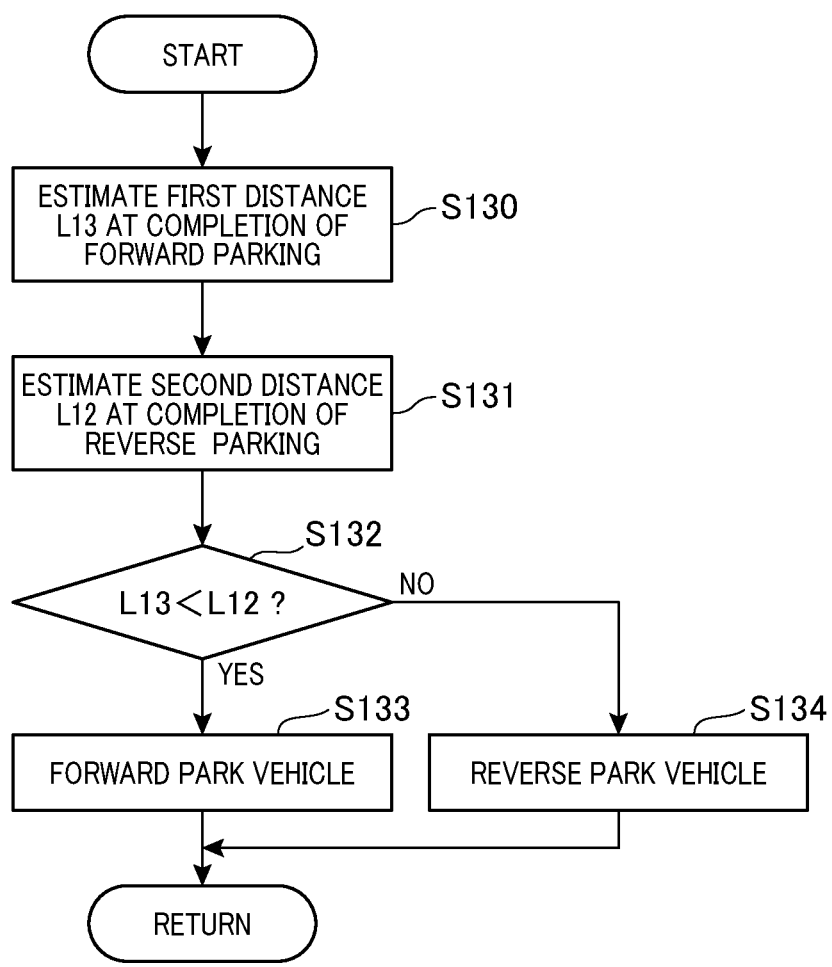
FIG. 14 is a flowchart of processing performed by a parking assistance ECU in accordance with a third embodiment of the present disclosure.

More specifically, the parking assistance controller 152, at step S12 shown in FIG. 3, performs processing shown in FIG. 14. As shown in FIG. 14, at step S130, assuming the vehicle 20 will be forward parked, the parking assistance controller 152 estimates a first distance L13 that is a distance between the charging port 24 and the electrical supply equipment 30 at completion of forward parking of the vehicle 20. At step S131 subsequent to step S130, the parking assistance controller 152 estimates a second distance L12 that is a distance between the charging port 24 and the electrical supply equipment 30 at completion of reverse parking of the vehicle 20.

At step S132 subsequent to step S131, the parking assistance controller 152 determines whether or not the first distance L13 is less than the second distance L12. If at step S132 it is determined that the first distance L13 is less than the second distance L12, then the parking assistance controller 152 determines that the charging port 24 can get closer to the electrical supply equipment 30 at completion of forward parking of the vehicle 20 than at completion of reverse parking of the vehicle 20. Therefore, the parking assistance controller 152, at step S133, determines to forward park the vehicle 20. If at step S132 it is determined that the second distance L12 is equal to or less than the first distance L13, then the parking assistance controller 152 determines that the charging port 24 can get closer to the electrical supply equipment 30 at completion of reverse parking of the vehicle 20 than at completion of forward parking of the vehicle 20. Therefore, the parking assistance controller 152, at step S134, determines to reverse park the vehicle 20.

In the present embodiment, the parking assistance apparatus 10 configured as above determines substantially the same parking directions as in the first embodiment. In situations shown in FIGS. 4E, 4H, 5F, 5G, 6D, 6I, 7D, 7I, 8F, 8G, 9E, and 9H, the parking assistance apparatus 10 of the present embodiment determines a parking direction for the vehicle 20 such that a distance between the charging port 24 and the electrical supply equipment 30 is minimized.

The present embodiment can provide the following advantage in addition to the advantage of the first embodiment.

(A3) The parking assistance controller 152 compares the first distance L12 at completion of forward parking of the vehicle 20 and the second distance L13 at completion of reverse parking of the vehicle 20, and based on the comparison result, determines a parking direction for the vehicle 20. With this configuration, an optimal parking direction for the vehicle 20 can be determined based on a relationship between the location of the charging port 24 at completion of parking of the vehicle 20 and the location of electrical supply equipment 30, which can more reliably obviate a situation where the charging cable 31 is too short to reach the charging port 24 at completion of parking of the vehicle 20. In addition, this configuration can reduce a length of the charging cable 31, thereby reducing the amount of copper cables and losses in the charging cable 31. Further, the electrical supply equipment 30 and the charging port 24 can get closer to each other, which allows the charging cable 31 to be more readily routed.

Fourth Embodiment

A forth embodiment will now be described. Only differences of the fourth embodiment from the first embodiment will be described.

The parking assistance controller 152 of the present embodiment is configured determine a parking location of the vehicle 20 such that the center of the vehicle 20 is offset from the center of the parking slot at completion of parking of the vehicle 20, thereby causing the location of the charging port 24 at completion of parking of the vehicle 20 to get closer to the installation location of the electrical supply equipment 30.

Figure 15:
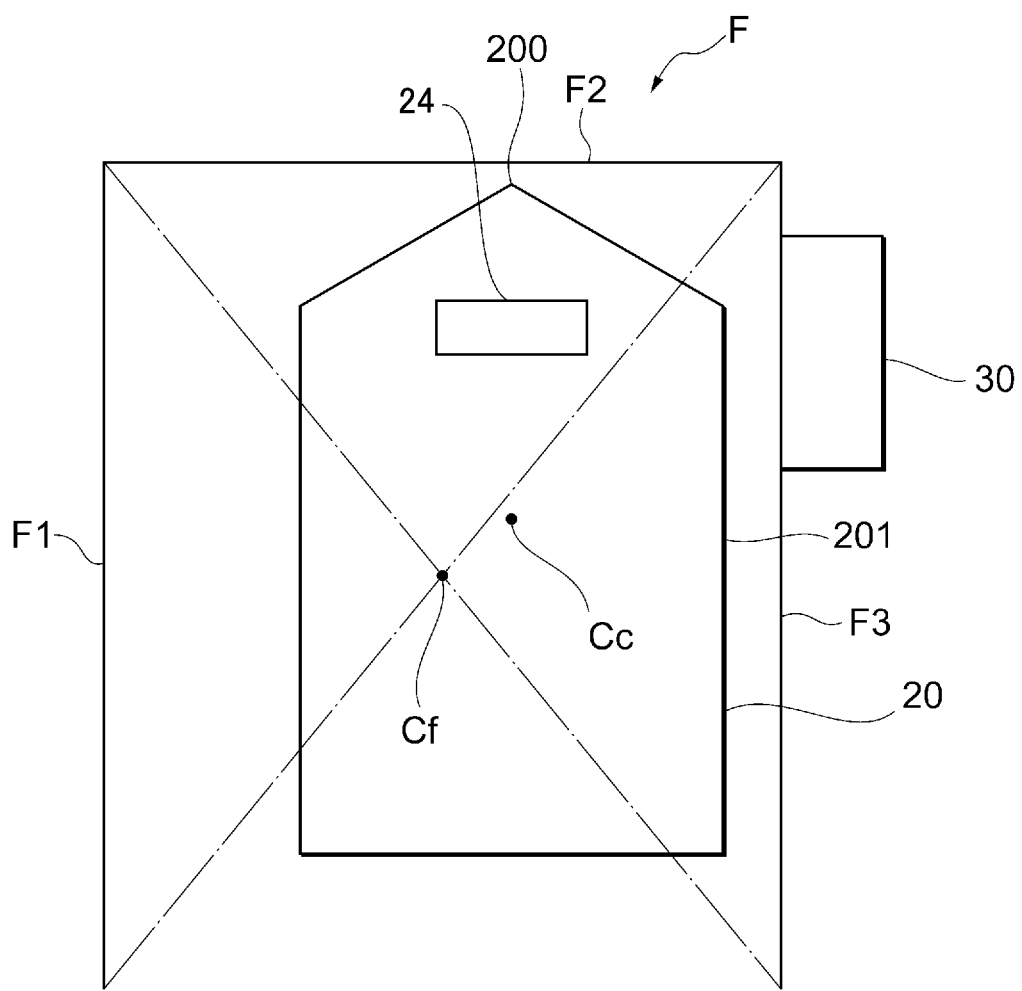
FIG. 15 is an example of a vehicle parking manner in accordance with a fourth embodiment of the present disclosure.

More specifically, at step S12 shown in FIG. 3, the parking assistance controller 152 determines to forward park the vehicle 20 as shown in FIG. 4G. In this case, the parking assistance controller 152, at step S13 shown in FIG. 3, sets a target parking location of the vehicle 20 as shown in FIG. 15. That is, the parking assistance controller 152 sets a parking location of the vehicle 20 such that the center Cc of the vehicle 20 is offset from the center Cf of the parking slot F in a direction that the location of the charging port 24 approaches the location of electrical supply equipment 30. The target parking location of the vehicle 20 is set such that the front end 200 of the vehicle 20 is spaced a predetermined distance apart from the distal side F2 of the parking slot F and the left side surface 201 of the vehicle 20 is spaced a predetermined distance apart from the right side F3 of the parking slot F.

As above, the parking assistance apparatus 10 of the present embodiment determines not only a parking direction for the vehicle 20, but also a parking location of the vehicle 20, as a parking manner of the vehicle 20.

In an alternative embodiment to the present embodiment, at step S12 shown in FIG. 3, the parking assistance controller 152 of the parking assistance ECU 15 may perform processing of the second embodiment as shown in FIG. 10 or processing of the third embodiment as shown in FIG. 14.

The present embodiment can provide the following advantage in addition to the advantage of the first embodiment.

(A4) The parking assistance controller 152 of the present embodiment is configured to determine a parking location of the vehicle 20 such that the center Cc of the vehicle 20 is offset from the center Cf of the parking slot F at completion of parking of the vehicle 20, thereby causing the location of the charging port 24 at completion of parking of the vehicle 20 to get closer to the installation location of the electrical supply equipment 30. Such a configuration that the charging port 24 can get closer to the electrical supply equipment 30 can more reliably obviate a situation where the charging cable 31 is too short to reach the charging port 24 at completion of parking of the vehicle 20. In addition, this configuration can reduce a length of the charging cable 31, thereby reducing the amount of copper cables and losses in the charging cable 31. Further, a distance between the electrical supply equipment 30 and the charging port 24 can be reduced, which allows the charging cable 31 to be more readily routed.

Fifth Embodiment

A fifth embodiment will now be described. Only differences of the fifth embodiment from the first embodiment will be described.

The parking assistance ECU 15 of the present embodiment includes a parking lot information acquirer 153 as indicated by a dashed line in FIG. 1 configured to acquire information for a parking lot. The parking assistance controller 152 recognizes a plurality of parking slots that are empty and adjacent to the electrical supply equipment 30 based on the parking lot information acquired by the parking lot information acquirer 153. The parking assistance controller 152 performs parking assistance control to automatically park the vehicle 20 in one of the plurality of parking slots such that a distance between the charging port 24 and the electrical supply equipment 30 at completion of parking of the vehicle 20 is minimized.

Parking assistance control processing performed by the parking assistance ECU 15 will now be described with reference to FIG. 16. The parking assistance ECU 15 is configured to initiate the processing shown in FIG. 16 upon detecting occupant's operations on the console 13 to initiate automatic parking in response to an operation signal transmitted from the console 13.

Figure 16:
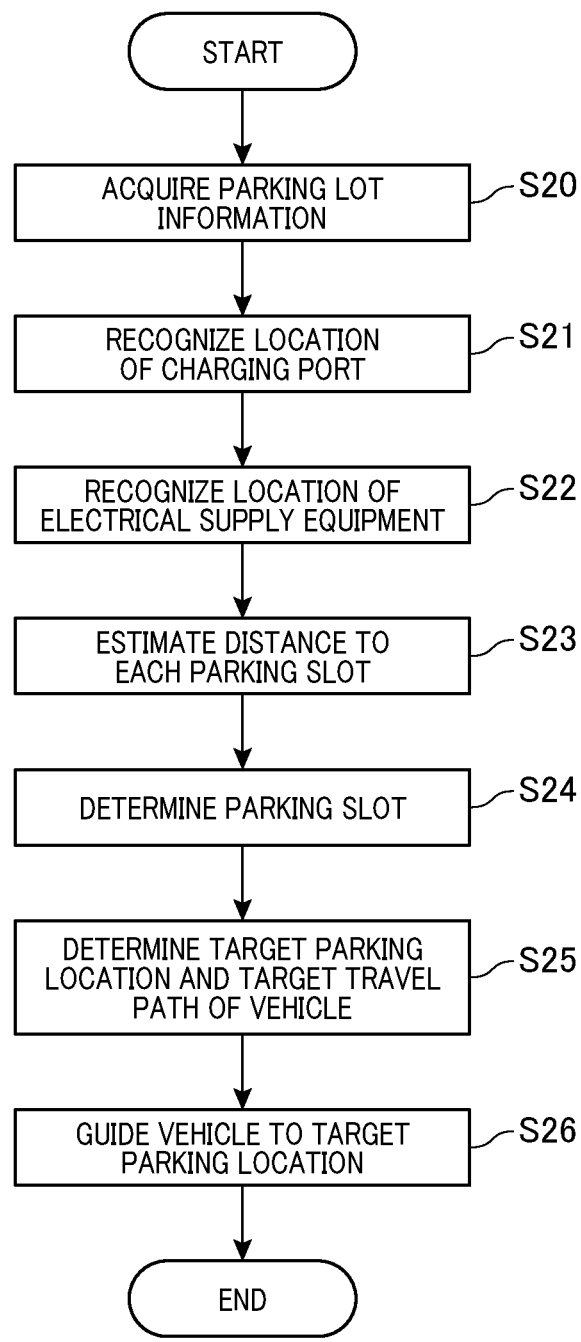
FIG. 16 is a flowchart of processing performed by a parking assistance ECU in accordance with a fifth embodiment of the present disclosure.

As shown in FIG. 16, at step S20, the parking lot information acquirer 153 acquires parking lot information that is information for a parking lot. For example, the parking assistance apparatus 10 acquires information for a parking lot present at distances ranging from the vehicle 20 to, for example, two or three vehicle lengths away based on the information transmitted from the image processing ECU 12, that is, image data acquired by the imager 11. In an alternative embodiment, the parking assistance apparatus 10 may acquire information for a parking lot present at distances in a wider range via cloud-based communications. More specifically, as shown in FIG. 1, the parking assistance apparatus 10 includes a network communication unit 16 (indicated by a dashed line) that is communicable with external devices to the vehicle 20 via a network 40. The parking lot information acquirer 153 can communicate with a server 41 via the network 40. The server 41 centrally manages the parking lot information. The parking lot information acquirer 153 acquires information for a parking lot, for example, information regarding the availability of parking slots within the parking lot by communicating with the server 41 via the network 40.

As shown in FIG. 16, at step S21 subsequent to step S20, the charging port recognizer 150 recognizes a mounting location of the charging port 24 on the vehicle 20. Since the processing of step S21 is the same as that of step S10 shown in FIG. 3, duplicate description is omitted.

At step S22 subsequent to step S21, the electrical supply equipment recognizer 151 recognizes a location of the electrical supply equipment 30 relative to each of a plurality of empty parking slots based on the parking lot information acquired at step S20. At step S22, the same processing as that of step S11 shown in FIG. 3 is performed for each of the plurality of parking slots that are empty.

Thereafter, at step S23, the parking assistance controller 152 determines a parking manner for each of the plurality of parking slots. That is, the parking assistance controller 152 determines, for each of the plurality of parking slots, whether to forward park or reverse park the vehicle in the parking slot. This processing of step S23 is performed by performing the processing of step S12 shown in FIG. 3 for each of the plurality of parking slots.

Figure 17:
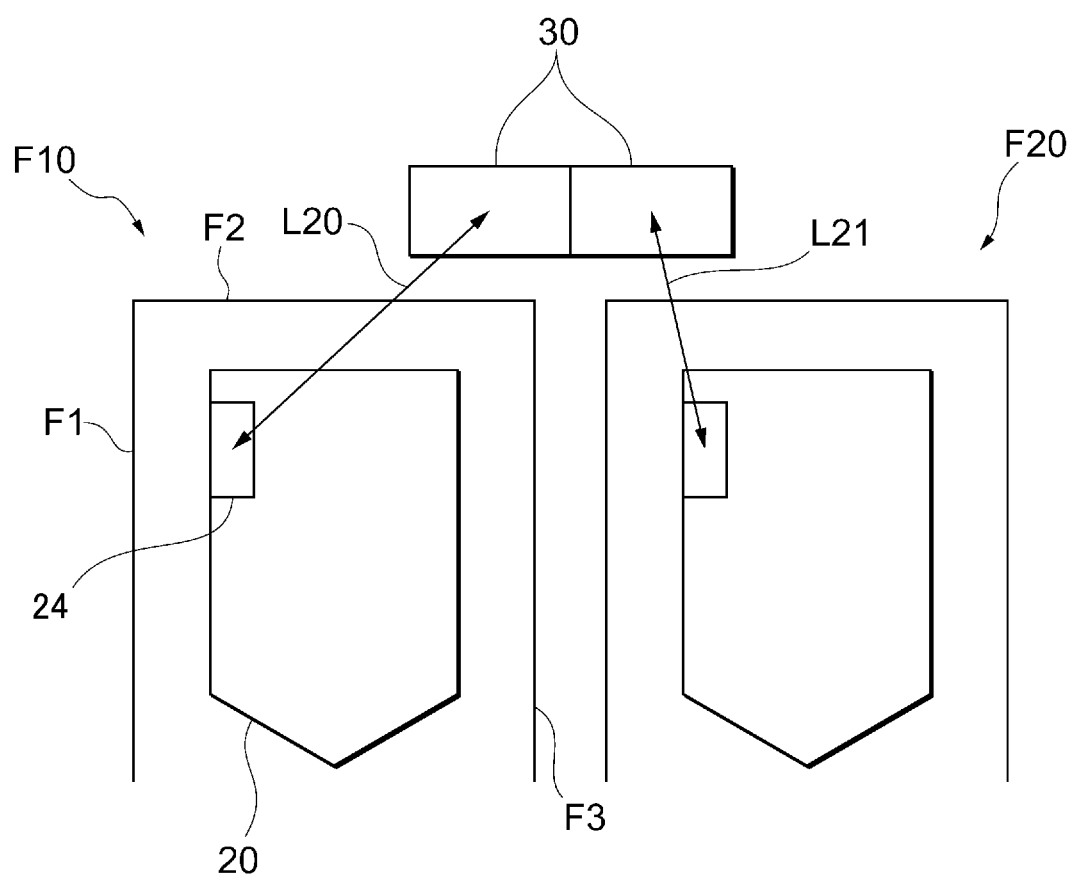
FIG. 17 is an illustration of selecting one of a plurality of parking slots for a vehicle to be parked in in accordance with the fifth embodiment.

At step S23 subsequent to step S22, the parking assistance controller 152 estimates, for each of the plurality of parking slots, a distance between the charging port 24 and the electrical supply equipment 30 at completion of parking of the vehicle 22 in the determined parking manner. In an example of FIG. 17, the parking assistance controller 152 has recognized a first parking slot F10 and a second parking slot F20 as a plurality of parking slots. In this case, after determining a parking manner of the vehicle 20 for each of the plurality of parking slots using the technique described in one of the first to fourth embodiments, the parking assistance controller 152 estimates a distance L20 between the charging port 24 and the electrical supply equipment 30 for the parking slot F10 and a distance L21 between the charging port 24 and the electrical supply equipment 30 for the parking slot F20.

As shown in FIG. 16, at step S24 subsequent to step S23, the parking assistance controller 152 compares the distance L20 for the first parking slot F10 and the distance L21 for the second parking slot F20 to determine one of the plurality of parking slots for the vehicle 20 to be parked in. More specifically, the parking assistance controller 152 determines one of the plurality of parking slots that corresponds to a shorter one of the distance L20 and the distance L21, as a parking slot for the vehicle 20 to be parked in. At step S25 subsequent to step S24, the parking assistance controller 152 sets a target parking location and a target travel path to park the vehicle 20 in the parking slot determined at step S24. Thereafter, at step S26, the parking assistance controller 152 performs cruise control to guide the vehicle 20 to the target parking location.

The present embodiment can provide the following advantage in addition to the advantage of the first embodiment.

(A5) The parking assistance controller 152 of the present embodiment is configured to perform automatic parking control such that the vehicle 20 is automatically parked in one of the plurality of empty parking slots, such as parking slots F10 and F20, in which a distance between the charging port 24 and the electrical supply equipment 30 at completion of parking of the vehicle 20 is minimal. In the case where there are a plurality of empty parking slots, this configuration can more reliably obviate a situation where the charging cable 31 is too short to reach the charging port 24 at completion of parking of the vehicle 20. In addition, this configuration can reduce a length of the charging cable 31, thereby reducing the amount of copper cables and losses in the charging cable 31. Further, a distance between the electrical supply equipment 30 and the charging port 24 can be reduced, which allows the charging cable 31 to be more readily routed.

Sixth Embodiment

A sixth embodiment will now be described. Only differences of the sixth embodiment from the first embodiment will be described.

The parking assistance apparatus 10 of the present embodiment is configured to, during parking assistance control, provide a notification of a parking manner to a driver of the vehicle 20 to assist the driver with driving the vehicle.

As shown in FIG. 18, at step S30, the parking assistance controller 152 determines the presence or absence of a demand for parking assistance from a driver of the vehicle. More specifically, upon detecting driver's predefined operations on the console 13, the parking assistance controller 152 determines that there is a demand for parking assistance from the driver. If at step S30 it is determined that there is a demand for parking assistance from the driver, then at step S31, the parking assistance controller 152 determines a parking direction for the vehicle 20. More specifically, using the technique described in one of the first to fifth embodiments, the parking assistance controller 152 determines a parking direction for the vehicle 20.

At step S32 subsequent to step S31, the parking assistance controller 152 notifies the driver of the parking direction determined at step S31 to assist the driver with driving the vehicle 20. The parking assistance apparatus 10 includes a notification unit 17 as indicated by a dashed line in FIG. 1 configured to provide a notification to the driver. The notification unit 17 may include a speaker for providing auditory assistance, a display for providing visual assistance, or the like. The display may be a display in an indicator panel or a display in an instrument panel.

The present embodiment can provide the following advantage in addition to the advantage of the first embodiment.

(A6) The parking assistance controller 152 is configured to, during parking assistance control, notify the driver of the vehicle 20 a parking direction via the notification unit 17. Even in the case of the vehicle 20 incorporating no automatic parking assistance control function, this configuration can more reliably obviate a situation where the charging cable 31 is too short to reach the charging port 24 on the vehicle 20 at completion of parking of the vehicle 20. In addition, this configuration can reduce a length of the charging cable 31, thereby reducing the amount of copper cables and losses in the charging cable 31.

Seventh Embodiment

A seventh embodiment will now be described. Only differences of the seventh embodiment from the first embodiment will be described.

The parking assistance apparatus 10 includes a display unit 18 as indicated by a dashed line in FIG. 1 configured to display a mounting location of the charging port 24 on the vehicle 20. The display unit 18, as shown in FIG. 19, displays a mounting location of the charging port 24 on the vehicle 20, as well as information on a vehicle speed, a battery level and the like.

The display unit 18 may be configured to normally display location information for the charging port 24 on the vehicle 20 or may be configured to display location information for the charging port 24 on the vehicle 20 only when it is recognized by a high-accuracy navigation device or the like that the vehicle 20 is located in a parking lot. In addition, the display unit 18 may be configured to display location information for the charging port 24 on the vehicle 20 only when the vehicle 20 is being manually driven.

The present embodiment can provide the following advantage in addition to the advantage of the first embodiment.

(A7) The parking assistance apparatus 10 of the present embodiment further includes the display unit 18 for displaying location information for the charging port 24 on the vehicle 20. This configuration allows an occupant of the vehicle 20 to readily recognize a location of the charging port 24 on the vehicle 20, which allows the vehicle 20 to be more readily parked such that the charging port 24 and the electrical supply equipment 30 can be connected.

Modifications

There will now be described some modifications that may be devised without departing from the spirit and scope of the present disclosure.

(M1) In the above embodiments, the parking assistance ECU 15 is configured to, upon detecting occupant's predefined operations on the console 13, initiate the processing shown in FIG. 2. In an alternative embodiment, the parking assistance ECU 15 may be configured to, upon detecting occupant's predefined operations on an electronic key to initiate automatic parking, initiate the processing shown in FIG. 2. That is, the processing shown in FIG. 2 may also be initiated when an occupant outside the vehicle 20 initiates remote parking or automatic valet parking of the vehicle 20.

(M2) In the above embodiments, the parking assistance ECU 15 performs parking assistance control to forward park or reverse park the vehicle 20. In an alternative embodiment, the parking assistance ECU 15 may perform parking assistance control to parallel park or perpendicular park the vehicle 20.

(M3) The means and/or functions provided by the parking assistance ECU 15 can be provided by software stored in a non-transitory computer-readable storage medium and a computer executing it, software only, hardware only, or a combination thereof. For example, when the parking assistance ECU 15 is provided by an electronic circuit which is hardware, it can be provided by a digital circuit including a number of logic circuits or an analog circuit.

(M4) The embodiments of the present disclosure have been described with reference to specific examples. However, the disclosure is not limited to those specific examples. Any design modification applied to such specific examples by a person skilled in the art is encompassed in the scope of the present disclosure, as long as it has the features of the present disclosure. Elements included in each of the above-mentioned specific examples, as well as the arrangement, are not limited to those illustrated in the specific examples and may be arbitrarily changed.

What is claimed is:

1. A parking assistance control apparatus for assisting parking a vehicle including a charging port that is connectable to electrical supply equipment via a charging cable, the apparatus comprising:
   a charging port recognizer configured to recognize a mounting location of the charging port on the vehicle;
   an electrical supply equipment recognizer configured to recognize an installation location of the electrical supply equipment; and
   a parking assistance controller configured to, based on the mounting location of the charging port on the vehicle and the installation location of the electrical supply equipment, determine a parking manner to park the vehicle, and based on the determined parking manner, perform parking assistance control.

2. The parking assistance control apparatus according to claim 1, wherein
   the parking assistance controller is configured to perform, as the parking assistance control, automatic parking control to automatically park the vehicle, and based on a relative relationship between the mounting location of the charging port and the installation location of the electrical supply equipment, determine a parking direction to park the vehicle during automatic parking control as the parking manner.

3. The parking assistance control apparatus according to claim 2, wherein
   the parking assistance controller is configured to determine whether to forward park or reverse park the vehicle as the parking direction to park the vehicle.

4. The parking assistance control apparatus according to claim 2, wherein
   the parking assistance controller is configured to determine the parking manner such that the center of the vehicle is offset from the center of a parking slot at completion of parking of the vehicle, thereby causing the charging port to get closer to the electrical supply equipment at completion of parking of the vehicle.

5. The parking assistance control apparatus according to claim 2, wherein
   the parking assistance controller is configured to notify a driver of the vehicle of the parking direction via a notification unit mounted on the vehicle.

6. The parking assistance control apparatus according to claim 1, wherein
   the parking assistance controller is configured to, based on the mounting location of the charging port, the installation location of the electrical supply equipment, and a length of the charging cable, determine the parking manner.

7. The parking assistance control apparatus according to claim 6, wherein
   the parking assistance controller is configured to perform automatic parking control to automatically park the vehicle as the parking assistance control, and
   the parking assistance controller is configured to, based on a determination as to whether or not a distance between the charging port and the electrical supply equipment at completion of parking of the vehicle is equal to or less than a distance threshold that is set based on a length of the charging cable, determine a parking direction during automatic parking control as the parking manner.

8. The parking assistance control apparatus according to claim 1, wherein the parking assistance controller is configured to perform automatic parking control to automatically park the vehicle as the parking assistance control, the parking assistance controller is configured to compare a first distance that is a distance between the charging port and the electrical supply equipment at completion of forward parking of the vehicle and a second distance that is a distance between the charging port and the electrical supply equipment at completion of reverse parking of the vehicle, the parking assistance controller is configured to, if the first distance is less than the second distance, then determine to forward park the vehicle when performing automatic parking control as the parking manner, and if the second distance is less than the first distance, then determine to reverse park the vehicle when performing automatic parking control as the parking manner.

9. The parking assistance control apparatus according to claim 1, further comprising a parking lot information acquirer configured to acquire parking lot information that is information regarding a parking lot for the vehicle to be parked in, wherein the parking assistance controller is configured to, based on the parking lot information, recognize a plurality of parking slots that are empty and adjacent to the electrical supply equipment, the parking assistance controller is configured to park the vehicle in one of the plurality of parking slots such that a distance between the charging port and the electrical supply equipment at completion of parking of the vehicle is minimized.

10. The parking assistance control apparatus according to claim 1, wherein the parking assistance controller is configured to display the mounting location of the charging port on the vehicle on a display unit mounted on the vehicle.

\* \* \* \* \*